(12) United States Patent
Yenigun et al.

(10) Patent No.: US 9,394,886 B2
(45) Date of Patent: Jul. 19, 2016

(54) SYSTEM AND METHOD FOR RE-INDEXING A PITCH BEARING OF A WIND TURBINE

(71) Applicant: General Electric Company, Schenectady, NY (US)

(72) Inventors: Esat Sadi Yenigun, Greenville, SC (US); Vishan Rashmi Kulasekera, Simpsonville, SC (US); Bradley Graham Moore, Greenville, SC (US); Ulrich Neumann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 680 days.

(21) Appl. No.: 13/787,958

(22) Filed: Mar. 7, 2013

(65) Prior Publication Data

US 2014/0255186 A1    Sep. 11, 2014

(51) Int. Cl.
*F03D 11/00* (2006.01)
*F03D 7/02* (2006.01)
*F03D 1/00* (2006.01)

(52) U.S. Cl.
CPC ............ *F03D 11/0008* (2013.01); *F03D 1/003* (2013.01); *F03D 7/0224* (2013.01); *F05B 2260/79* (2013.01); *Y02E 10/722* (2013.01); *Y02E 10/723* (2013.01)

(58) Field of Classification Search
CPC ... F03D 1/0658; F03D 11/0008; F03D 1/003; F05B 2260/79; Y02E 10/721; Y02E 10/722
See application file for complete search history.

(56) References Cited

U.S. PATENT DOCUMENTS

| 7,726,941 | B2 | 6/2010 | Bervang |
| 8,584,355 | B2 | 11/2013 | Holling |
| 8,651,462 | B2 * | 2/2014 | Van Berlo ............... F03D 1/001 254/278 |
| 2010/0139062 | A1 * | 6/2010 | Reed ........................ F03D 1/001 29/23.51 |
| 2010/0254813 | A1 * | 10/2010 | Dawson ................ B66C 23/207 416/146 R |
| 2012/0073134 | A1 * | 3/2012 | Bywaters ................ F03D 1/003 29/889.1 |
| 2012/0141280 | A1 * | 6/2012 | Holling ................... F03D 1/003 416/204 R |
| 2014/0010661 | A1 * | 1/2014 | Hancock ................. F03D 1/003 416/207 |

* cited by examiner

*Primary Examiner* — Devon Kramer
*Assistant Examiner* — Christopher Bobish
(74) *Attorney, Agent, or Firm* — Dority & Manning, P.A.

(57) ABSTRACT

A method and system for re-indexing a pitch bearing of a wind turbine includes: installing a plurality of first mounts to the fixed outer race of the pitch bearing; positioning the rotor blade to a downwardly-oriented; installing a hydraulic system; pressurizing the hydraulic system so as to support the weight of the rotor blade with the hydraulic system; detaching the rotor blade from the pitch bearing; lowering the rotor blade a predetermined vertical distance from the hub; installing a plurality of second mounts to the rotor blade; attaching a plurality of supports between the first mounts and the second mounts; transferring the weight of the rotor blade from the hydraulic system to the plurality of supports; disengaging the hydraulic system; and re-indexing the pitch bearing so as to engage a new set of pitch bearing teeth.

7 Claims, 8 Drawing Sheets

SYSTEM AND METHOD FOR RE-INDEXING A PITCH BEARING OF A WIND TURBINE

FIELD OF THE INVENTION

The present subject matter relates generally to wind turbines and, more particularly, to systems and methods for re-indexing a pitch bearing of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation, a pitch bearing may become worn causing one or more of the rotor blades to move from a desired pitch setting. The normal operational pitch range of the rotor blades is generally far less than the complete circumferential range of the bearing and, in the event of a worn sector of the bearing, the bearing can be indexed to a new sector relative to the pitch drive gear/motor. This procedure is typically carried out by removing and lowering the rotor blade, indexing the pitch bearing so to engage a new set of pitch bearing teeth, and raising and re-attaching the rotor blade. Current systems and methods for removing rotor blades utilize large, specialized cranes because the cranes must have load capacity to lower the blade from the hub to the ground and then back up to the height of the hub. Such cranes are costly to use, lease, and/or maintain, and often require dedicated road construction simply to bring the crane to the wind turbine site.

Thus, an improved system and method for re-indexing a pitch bearing of a wind turbine would be advantageous. For example, a system and method for re-indexing a pitch bearing of a wind turbine wherein the rotor blade need not be lowered to the ground would be desired in the art.

BRIEF DESCRIPTION OF THE INVENTION

Aspects and advantages of the invention will be set forth in part in the following description, or may be obvious from the description, or may be learned through practice of the invention.

In one embodiment, a method for re-indexing a pitch bearing of a wind turbine is disclosed. The pitch bearing may be of the type operably coupled between a hub and a rotor blade. Further, the pitch bearing may have a fixed outer race and a rotatable inner race. The rotor blade may be of the type having a root flange bolted on to the inner race. The method may include: installing a plurality of first mounts to the fixed outer race of the pitch bearing; positioning the rotor blade to a downwardly-oriented position, such as the six o'clock position; installing a hydraulic system between the pitch bearing and the root flange of the rotor blade; pressurizing the hydraulic system so as to support the weight of the rotor blade with the hydraulic system; unbolting the rotor blade from the pitch bearing with the hydraulic system pressurized; lowering the rotor blade a predetermined distance from the hub using the hydraulic system; installing a plurality of second mounts to the rotor blade; attaching a plurality of supports between the first mounts and the second mounts; transferring the weight of the rotor blade from the hydraulic system to the plurality of supports; disengaging the hydraulic system from the pitch bearing and the root flange of the rotor blade; and re-indexing the pitch bearing so as to engage a new set of pitch bearing teeth.

In another embodiment, the hydraulic system may include a plurality of hydraulic cylinders with jacking studs that fit through the pitch bearing and the root flange of the rotor blade. Further, the method may include installing the hydraulic cylinders on the pitch bearing by removing a plurality of rotor blade bolts and a plurality of rotor blade nuts. The plurality of rotor blade bolts are typically disposed through the pitch bearing and the rotor blade. As such, the method may further include replacing the removed rotor blade bolts with the jacking studs of the hydraulic cylinders.

In still another embodiment, the lowering of the rotor blade with the hydraulic system may further include lowering the rotor blade to a first vertical distance dictated by the jacking studs, and subsequently replacing the jacking studs with displacing studs having a longer axial length than the jacking studs. As such, the method may further include lowering the rotor blade to a final predetermined vertical distance with the displacing studs. In another embodiment, the method may include attaching a blade harness and at least one tail end support line to the rotor blade, wherein the at least one tail end support line is attached to the blade harness and a tail pick crane.

In yet another embodiment, the plurality of second mounts may be installed on the root flange of the rotor blade. In a further embodiment, the plurality of supports may be one or a combination of chains, supports, or similar. In yet another embodiment, the method may include coupling at least one hoist to one of the plurality of first mounts, wherein the hoist is configured to lift the plurality of supports.

In another embodiment, a system for re-indexing a pitch bearing of a wind turbine is disclosed. The system may include a plurality of first mounts configured to attach to a fixed outer race of the pitch bearing; a plurality of second mounts configured to attach to a root flange the rotor blade; a hydraulic system engageable between the root flange of the rotor blade and an inner race of the pitch bearing for lowering the rotor blade a first vertical distance from the hub; and a plurality of supports connectable between the plurality of first mounts and the plurality of second mounts to support the rotor blade while re-indexing the pitch bearing.

In another embodiment, the system may include a hydraulic system having a plurality of hydraulic cylinders with jacking studs that fit through the pitch bearing and the root flange of the rotor blade. Further, the system may include a plurality of displacing studs having an axial length greater than the plurality of jacking studs. Moreover, the plurality of displacing studs may be configured to replace the plurality of jacking studs so as to lower the rotor blade a second vertical distance from the hub. Additionally, the second vertical distance may be greater than the first vertical distance.

In still another embodiment, the system may include a blade harness and at least one tail end support line, wherein the at least one tail end support line is attached to the blade harness and a tail pick crane. Further, the plurality of supports may be one or a combination of chains, cables, or similar. Additionally, the system may further include a hoist configured to attach to one of the plurality of first mounts, wherein the hoist is configured to lift the plurality of supports.

Yet another method embodiment for re-indexing a pitch bearing of a wind turbine includes positioning the rotor blade to a downwardly oriented position; unbolting the rotor blade from the pitch bearing and lowering the rotor blade a fixed distance from the hub; fully supporting the rotor blade at the lowered distance by a support system installed between the rotor blade and the hub; and while the rotor blade is fully supported by the support system, re-indexing the inner race of the pitch bearing so as to engage a new set of pitch bearing teeth.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
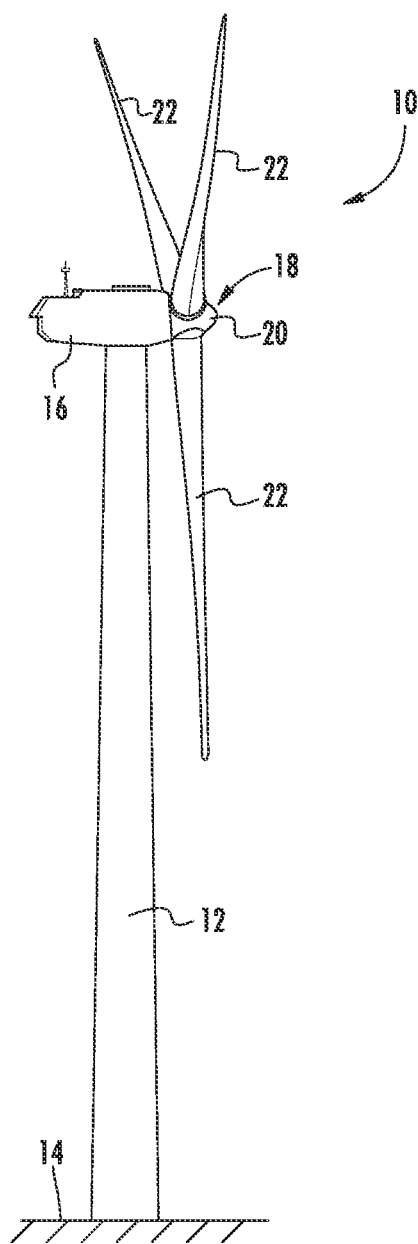
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 is operatively coupled to the rotor 18 by a pitch bearing (not shown). Further, each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
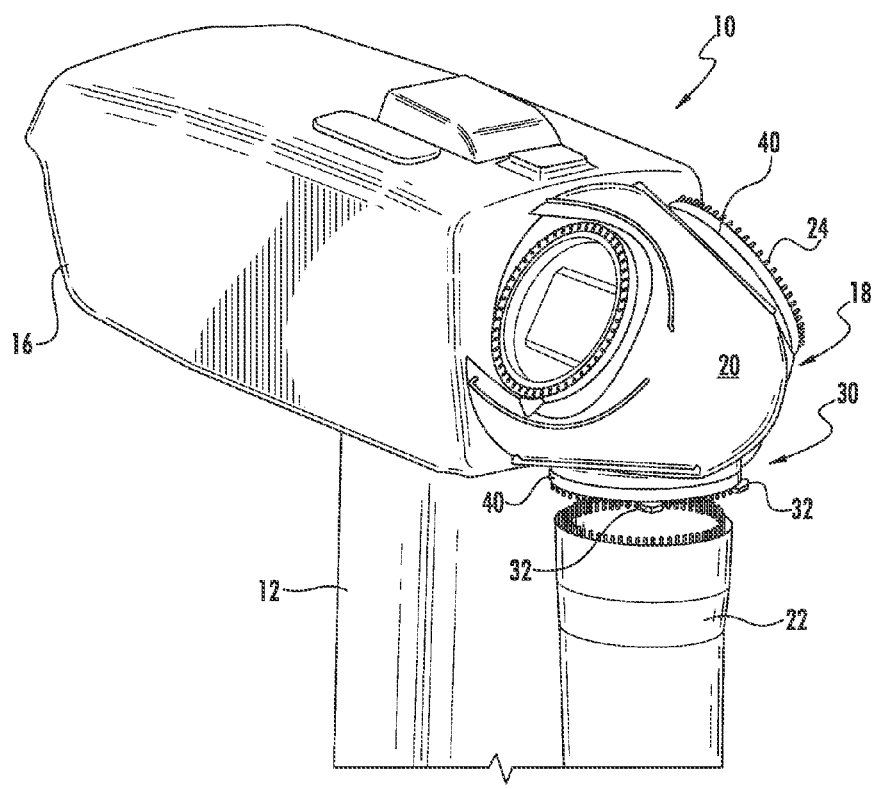
FIG. 2 illustrates an exploded view of a system for re-indexing a pitch bearing according to the present disclosure.

Referring now to FIG. 2, an exploded view of a system 30 for re-indexing a pitch bearing of a wind turbine is illustrated. The system 30 may include a plurality of first mounts 32; a plurality of second mounts (not shown); a hydraulic system for lowering the rotor blade a first vertical distance from the hub (not shown); and a plurality of supports connected between the plurality of first and second mounts. The depicted embodiment illustrates system 30 incorporated with rotor blade 22, which is typically operatively coupled to the hub 20 by pitch bearing 40 and a plurality of rotor blades bolts 24. Further, the illustrated embodiment of system 30 discloses rotor blade 22 in a six o'clock position. The system 30 includes one or more first mounts 32 installed to the fixed outer race of the pitch bearing 40 by an operator within the hub 20. Such installation is typically completed while the rotor blade 22 is in a twelve o'clock position; however, installation of the first mounts is not limited to this configuration. Further, in one embodiment, three first mounts 32 may be installed on the root flange 26, however, in further embodiments, more than three or less than three first mounts may be installed on the root flange 26.

Figure 3:
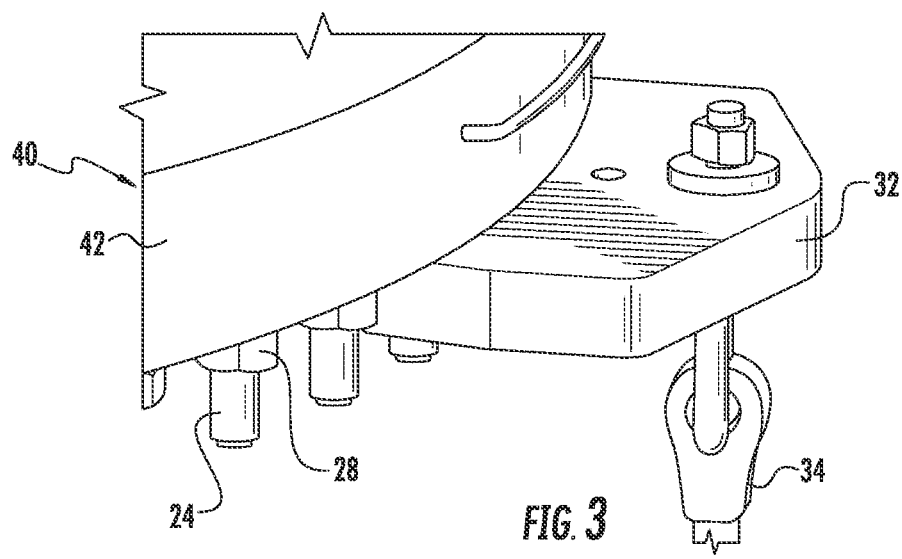
FIG. 3 illustrates one embodiment of a first mount according to the present disclosure.

Referring now to FIG. 3, a detailed schematic of one of the first mounts 30 attached to the fixed outer race 42 of the pitch bearing 40 is illustrated. The first mount 32 is attached the fixed outer race 42 by at least one rotor blade bolt 24 and corresponding nut 28. In another embodiment, the first mount 32 may be attached to the fixed outer race 42 by a plurality of rotor blade bolts 24 and nuts 28. In still further embodiments, the first mounts 32 may be installed in any suitable manner known in the art. Further, a hoist 34 may be attached to any one of or all of the first mounts 32. As such, the hoist 34 may be configured to lift the plurality of supports (FIGS. 8-10) from the ground or from any lower position.

Figure 4:
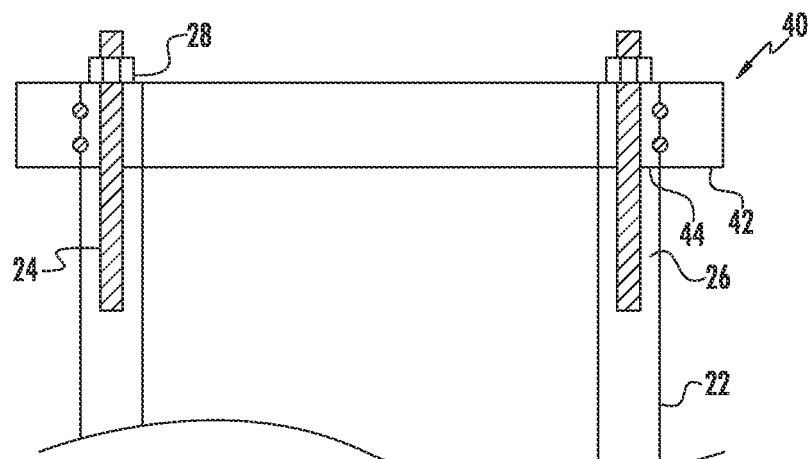
FIG. 4 illustrates a cross-sectional view of a portion of the system according to the present disclosure.
Figure 5:
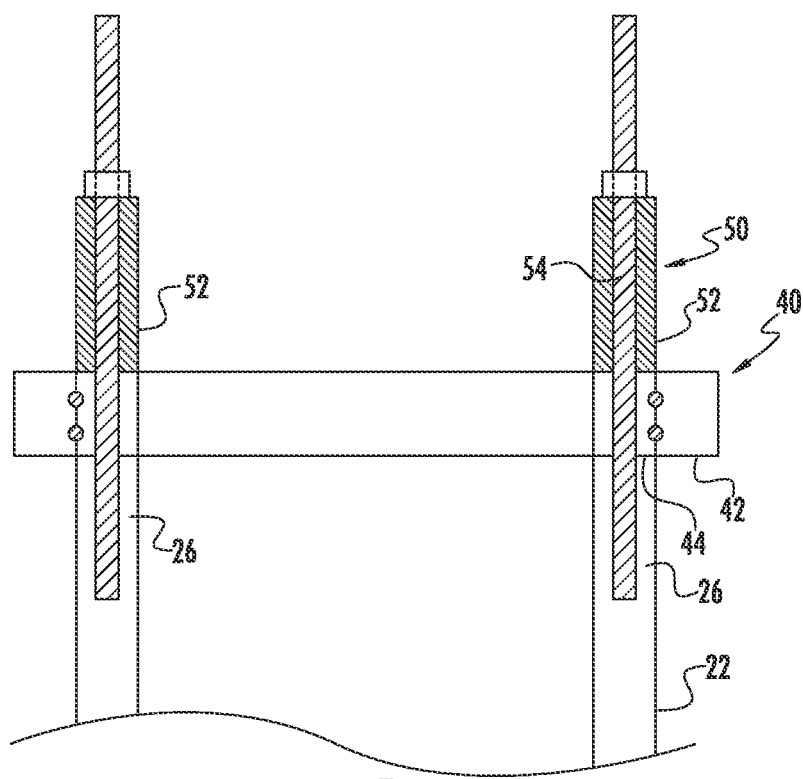
FIG. 5 illustrates another cross-sectional view of a portion of the system according to the present disclosure.

Referring now to FIGS. 4-7, the hydraulic system 50 of the system 30 is illustrated in stages of installation (as viewed from inside the hub). FIG. 4 illustrates a cross-sectional side view of the rotor blade 22 coupled to the pitch bearing 40 in the six o'clock position before the hydraulic system 50 has been installed. As depicted, a plurality of rotor blade bolts 24 are disposed through the inner race 44 of the pitch bearing 40 and the rotor blade 22. More specifically, the bolts 24 are disposed through the rotor blade flange 26. The bolts 24 are secured within the rotor blade flange 26 by rotor blade nuts 28. FIG. 5 illustrates the hydraulic system 50 installed on the inner race 44 of the pitch bearing 40. As illustrated, the hydraulic system 50 is engageable between the root flange 26 of the rotor blade 22 and the inner race 42 of the pitch bearing 40 so as to lower the rotor blade 22 a first vertical distance $D_1$ (FIG. 6) from the hub 20. Further, the hydraulic system 50 may include a plurality of hydraulic cylinders 52 with jacking studs 54 that fit through the pitch bearing 40 and the root flange 26 of the rotor blade 22. As depicted, the hydraulic cylinders 52 have been installed on the inner race 44 of the pitch bearing 40 by removing a plurality of rotor blade bolts 24 and corresponding blade nuts 28 (FIG. 4) and replacing them with the jacking studs 54 of the hydraulic cylinders 52.

Figure 6:
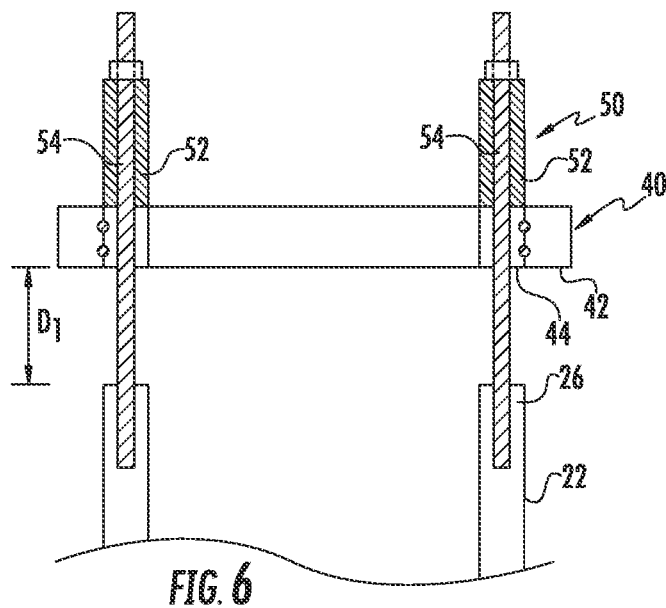
FIG. 6 illustrates another cross-sectional view of a portion of the system according to the present disclosure.
Figure 7:
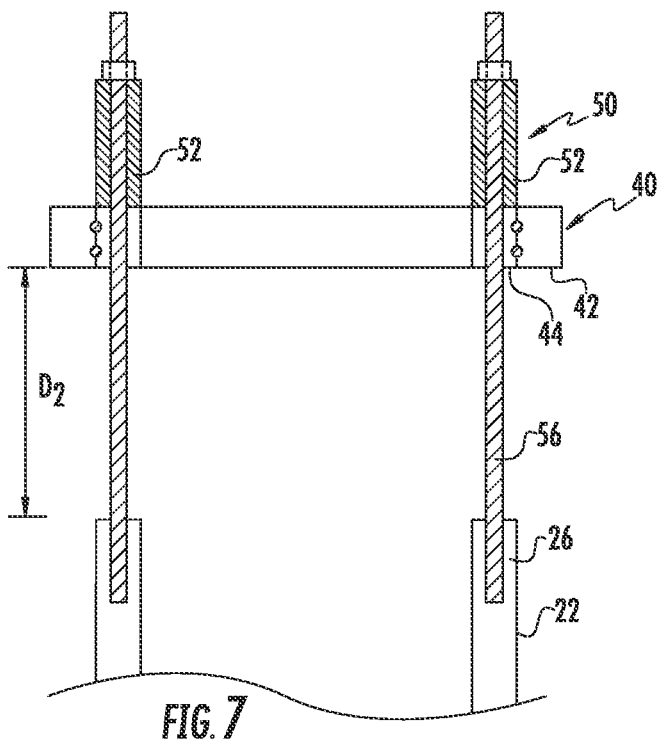
FIG. 7 illustrates another cross-sectional view of a portion of the system according to the present disclosure.

Referring now to FIG. 6, the hydraulic system 50 may be pressurized so as to support the weight of the rotor blade 22 with the hydraulic system 50. Further, the rotor blade 22 may be detached from the pitch bearing 40. More specifically, the remaining nuts 28 may be removed from the other rotor blade bolts 54 (that have not been replaced with a hydraulic cylinder) so that the jacking studs 54 of the hydraulic cylinders 52 may be used to lower the rotor blade 22. As illustrated, the rotor blade 22 has been lowered a predetermined vertical distance $D_1$ from the hub using the hydraulic system 50. If needed, the jacking studs 54 may be subsequently replaced with displacing studs 56 (FIG. 7) that have a longer axial length than the jacking studs 54. As such, the rotor blade 22 may be further lowered to a final predetermined vertical distance $D_2$ with the displacing studs 54 (FIG. 7). Further, the second vertical distance $D_2$ may be greater than the first vertical distance $D_1$ as illustrated in FIGS. 6 and 7.

Figure 8:
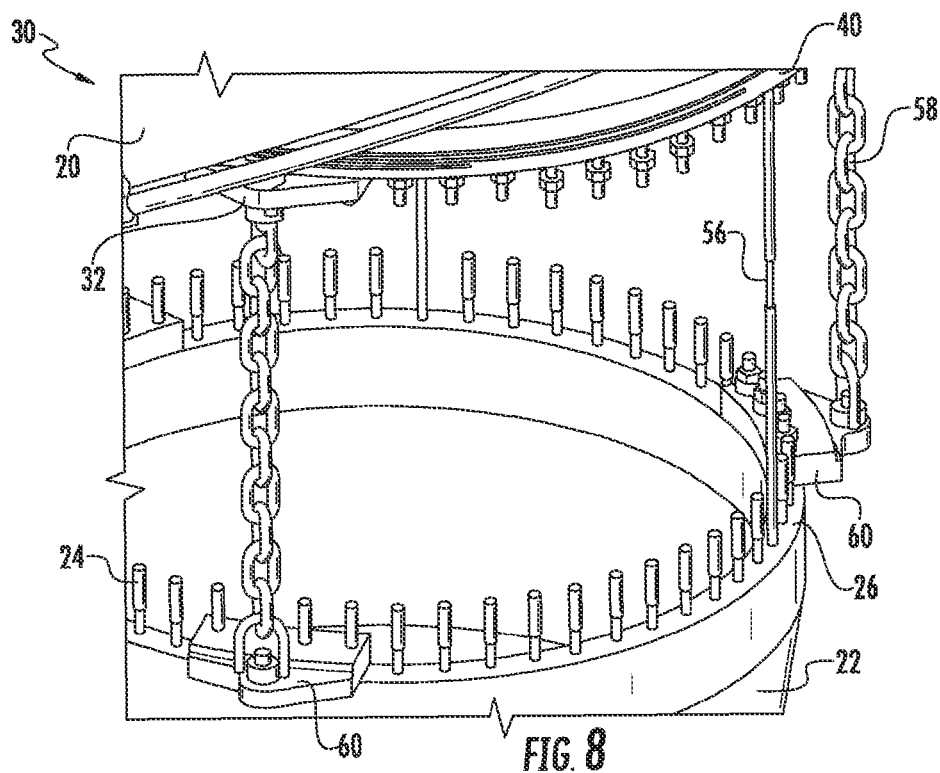
FIG. 8 illustrates a perspective view of one embodiment of the system according to the present disclosure.

Referring now to FIG. 8, an outer perspective view of the system 30 for re-indexing the pitch bearing is illustrated. As depicted, the system 30 includes a plurality of second mounts 60 attached to the rotor blade 22. More specifically, the plurality of second mounts 60 are installed on the root flange 26 of the rotor blade 22. The second mounts 60 may also align vertically with the first mounts 32. Further, any suitable number of second mounts may be installed on the rotor blade. For example, as illustrated, three second mounts 60 may be installed on the root flange 26. In additional embodiments, more than three second mounts 60 or less than three second mounts may be installed on the root flange 26. Further, the system 30 may include a plurality of supports 58 connectable between the plurality of first mounts 30 and the plurality of second mounts 60. The plurality of cables 58 may be any one or combination of chains, cables, or similar.

Figure 9:
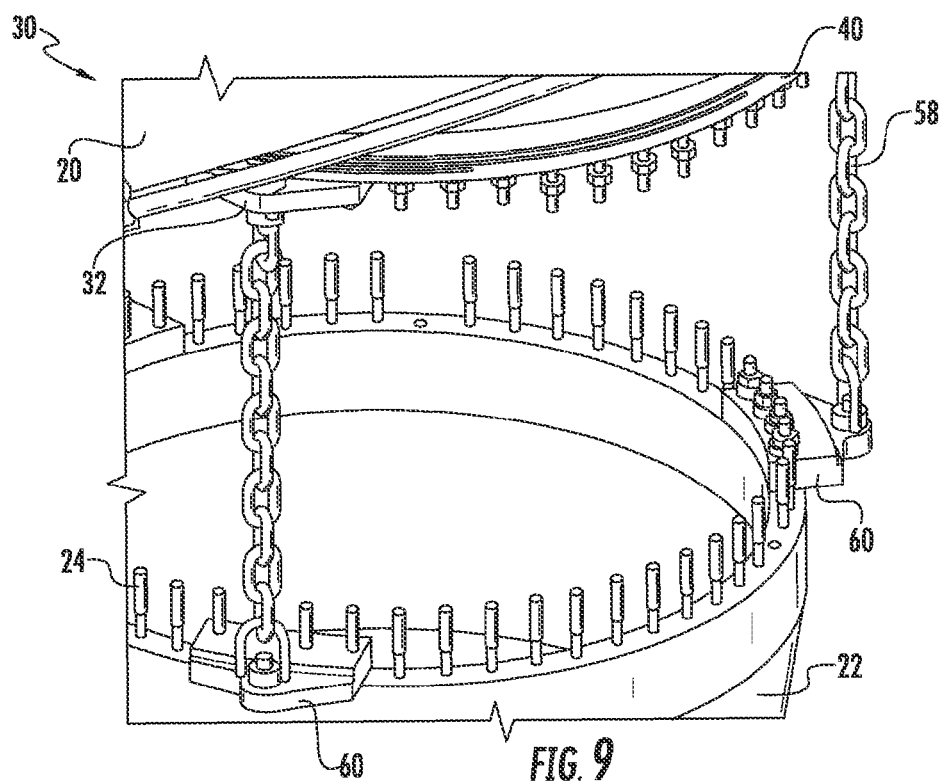
FIG. 9 illustrates another perspective view of one embodiment of the system according to the present disclosure.

After the plurality of supports are installed, the weight of the rotor blade 22 may be transferred from the displacing studs 56 to the plurality of supports 58 such that the displacing studs 56 may be subsequently removed, as shown in FIG. 9. The hydraulic system 50 may then be disengaged from the pitch bearing 40 and the root flange 26 of the rotor blade 22 (FIG. 9) and removed from the system. The plurality of supports, therefore, are configured to support the entire weight of the rotor blade 22. As such, the pitch bearing 40 may then be re-indexed so as to engage a new set of pitch bearing teeth. Accordingly, the pitch bearing 40 may be re-indexed without lowering the rotor blade to the ground, thereby eliminating the use of large, specialized cranes.

Figure 10:
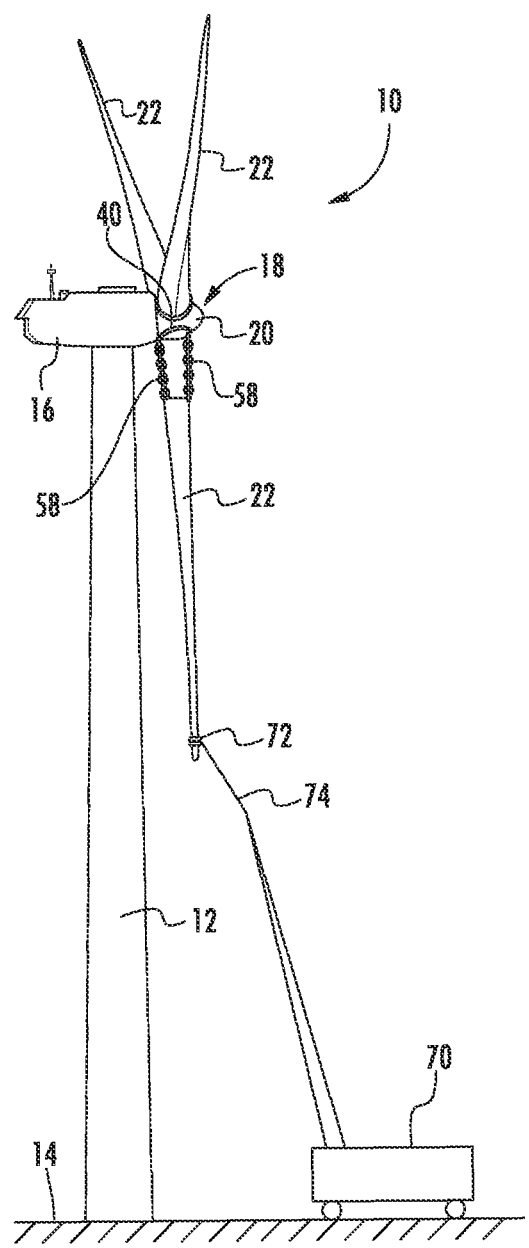
FIG. 10 illustrates another embodiment of the system according to the present disclosure.

Referring now FIG. 10, the system 30 may also include a blade harness 72 attached to the rotor blade 22. The blade harness 72 may be any suitable harness known in the art and may wrap around the entire blade or a portion thereof. Further, the blade harness 72 may also be attached to at least one tail end support line 72 that is attached to a tail pick crane 70. Such a configuration provides additional stability to the rotor blade 22 during the pitch bearing 40 re-indexing process.

Figure 11:
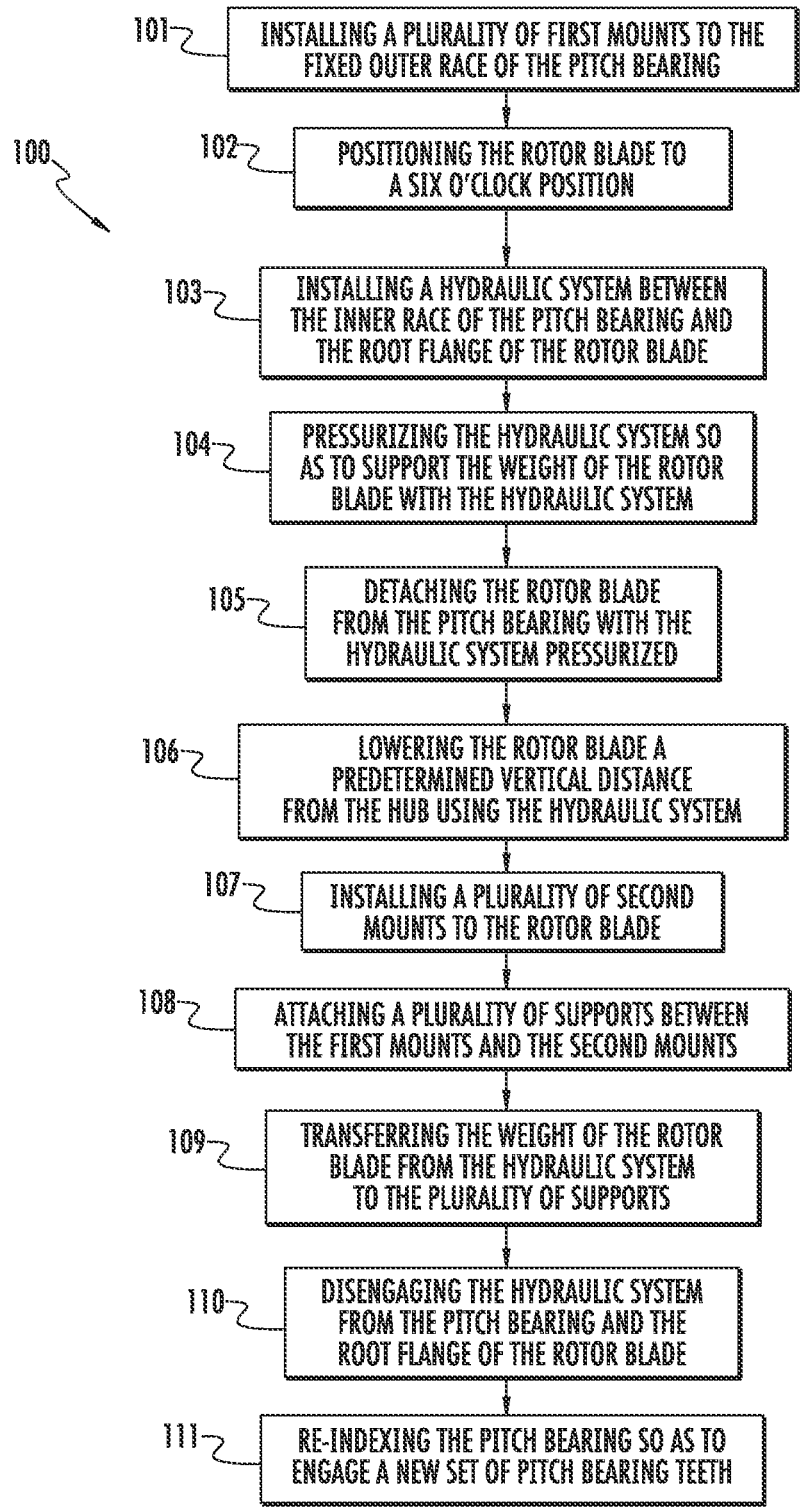
FIG. 11 illustrates one embodiment of a method for re-indexing a pitch bearing according to the present disclosure.

Referring now to FIG. 11, one embodiment of a method 100 for re-indexing a pitch bearing of a wind turbine is illustrated. The method 100 may include positioning the rotor blade to a twelve o'clock position. Another step of the method 100 may include (step 101) installing a plurality of first mounts to the fixed outer race of the pitch bearing. Further, the method 100 may include (step 102) positioning the rotor blade to a six o'clock position. A next step includes (step 103) installing a hydraulic system between the inner race of the pitch bearing and the root flange of the rotor blade. Another step (step 104) includes pressurizing the hydraulic system so as to support the weight of the rotor blade with the hydraulic system. Additionally, the method 100 may include (step 105) detaching the rotor blade from the pitch bearing with the hydraulic system pressurized.

Another step (step 106) includes lowering the rotor blade a predetermined vertical distance from the hub using the hydraulic system. The step of lowering the rotor blade with the hydraulic system may also include lowering the rotor blade to a first vertical distance dictated by the jacking studs, and subsequently replacing the jacking studs with displacing studs that have a longer axial length than the jacking studs, and then lowering the rotor blade to a final predetermined vertical distance with the displacing studs.

Another step (step 107) includes installing a plurality of second mounts to the rotor blade. More specifically, the second mounts may be installed on the root flange of the rotor blade. An additional step (step 108) may also include attaching a plurality of supports between the first mounts and the second mounts. The method 100 may also include (step 109) transferring the weight of the rotor blade from the hydraulic system to the plurality of supports. Additionally, the method 100 may include (step 110) disengaging the hydraulic system from the pitch bearing and the root flange of the rotor blade such that the pitch bearing may be re-indexed. Another step of method 100 includes (step 111) re-indexing the pitch bearing so as to engage a new set of pitch bearing teeth.

The method 100 may further include installing a plurality of hydraulic cylinders on the pitch bearing by removing a plurality of rotor blade nuts and a plurality of rotor blade bolts disposed through the pitch bearing and the rotor blade. Further, the method 100 may include replacing the removed rotor blade bolts with the jacking studs of the hydraulic cylinders. In another embodiment, the method 100 may include attaching a blade harness and at least one tail end support line to the rotor blade. Further, the tail end support line may be attached to the blade harness and a tail pick crane. Such a configuration provides additional stability while the pitch bearing is being re-indexed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for re-indexing a pitch bearing of a wind turbine, the pitch bearing operably coupled between a hub and a rotor blade, the pitch bearing having a fixed outer race and a rotatable inner race, the rotor blade having a root flange bolted onto the inner race, the method comprising:

installing a plurality of first mounts to the fixed outer race of the pitch bearing;
positioning the rotor blade to a downwardly-oriented;
installing a hydraulic system between the inner race of the pitch bearing and the root flange of the rotor blade;
pressurizing the hydraulic system so as to support the weight of the rotor blade with the hydraulic system;
unbolting the rotor blade from the pitch bearing with the hydraulic system pressurized;

lowering the rotor blade a predetermined distance from the hub using the hydraulic system;

installing a plurality of second mounts to the rotor blade, the second mounts physically separate from the first mounts;

attaching a plurality of supports between the first mounts and the second mounts, the plurality of supports comprising chains or cables;

transferring the weight of the rotor blade from the hydraulic system to the plurality of supports;

disengaging the hydraulic system from the pitch bearing and the root flange of the rotor blade; and re-indexing the pitch bearing so as to engage a new set of pitch bearing teeth.

2. The method as in claim 1, wherein the hydraulic system comprises a plurality of hydraulic cylinders with jacking studs that fit through the pitch bearing and the root flange of the rotor blade.

3. The method as in claim 2, further comprising installing the hydraulic cylinders on the pitch bearing by removing a plurality of rotor blade nuts and a plurality of rotor blade bolts, the plurality of rotor blade bolts disposed through the pitch bearing and the rotor blade; and replacing the removed rotor blade bolts with the jacking studs of the hydraulic cylinders.

4. The method as in claim 3, wherein the lowering of the rotor blade with the hydraulic system comprises lowering the rotor blade to a first vertical distance dictated by the jacking studs, and subsequently replacing the jacking studs with displacing studs that have a longer axial length than the jacking studs, and then lowering the rotor blade to a final predetermined vertical distance with the displacing studs.

5. The method as in claim 1, wherein the plurality of second mounts are installed on the root flange of the rotor blade.

6. The method as in claim 1, further comprising attaching a blade harness and at least one tail end support line to the rotor blade, wherein the at least one tail end support line is attached to the blade harness and a tail pick crane.

7. The method as in claim 1, further comprising coupling at least one hoist to one of the plurality of first mounts, wherein the hoist is configured to lift the plurality of supports.

* * * * *